US011897770B2

(12) United States Patent
Jeong et al.

(10) Patent No.: US 11,897,770 B2
(45) Date of Patent: Feb. 13, 2024

(54) METHOD FOR PRODUCING DENSIFIED CARBON NANOTUBE FIBER

(71) Applicant: KOREA INSTITUTE OF SCIENCE AND TECHNOLOGY, Seoul (KR)

(72) Inventors: Hyeon Su Jeong, Jeollabuk-do (KR); Seung Min Kim, Jeollabuk-do (KR); Sook Young Moon, Jeollabuk-do (KR); Dong Myeong Lee, Jeollabuk-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 506 days.

(21) Appl. No.: 17/101,198

(22) Filed: Nov. 23, 2020

(65) Prior Publication Data

US 2021/0323826 A1     Oct. 21, 2021

(30) Foreign Application Priority Data

Apr. 17, 2020   (KR) ................ 10-2020-0046900

(51) Int. Cl.
| | |
|---|---|
| *D01D 5/00* | (2006.01) |
| *C01B 32/168* | (2017.01) |
| *D01F 9/12* | (2006.01) |
| *D01D 5/06* | (2006.01) |
| *D01F 11/10* | (2006.01) |

(52) U.S. Cl.
CPC ......... *C01B 32/168* (2017.08); *D01D 5/0046* (2013.01); *D01D 5/06* (2013.01); *D01F 9/12* (2013.01); *C01P 2004/03* (2013.01); *C01P 2006/10* (2013.01); *D01F 11/10* (2013.01)

(58) Field of Classification Search
CPC ........... D01D 5/0046; D01D 5/06; D01F 9/12
See application file for complete search history.

(56) References Cited

U.S. PATENT DOCUMENTS

| | | | |
|---|---|---|---|
| 10,246,333 B1 | 4/2019 | Kim et al. | |
| 2023/0304193 A1* | 9/2023 | Franklin | ................ D01F 11/00 |

FOREIGN PATENT DOCUMENTS

| | | |
|---|---|---|
| EP | 1404908 B1 | 11/2007 |
| EP | 3514110 A1 | 7/2019 |
| KR | 10-2010-0100847 A | 9/2010 |
| KR | 10-1726823 B1 | 4/2017 |
| KR | 10-2019-0013343 A | 2/2019 |
| KR | 10-1972987 B1 | 4/2019 |
| KR | 10-2019-0127688 A | 11/2019 |

(Continued)

OTHER PUBLICATIONS

Cho Hyunjung et al: "Hierarchical structure of carbon nanotube fibers, and the change of structure during densification by wet stretching", Carbon, Elsevier Oxford, GB, vol. 136, Apr. 25, 2018 (Apr. 25, 2018), pp. 409-416, XP085431477, ISSN: 0008-6223, DOI: 10.1016/ J.CARBON.2018.04.071.

(Continued)

*Primary Examiner* — Tajash D Patel
(74) *Attorney, Agent, or Firm* — RABIN & BERDO, P.C.

(57) ABSTRACT

Disclosed is a method for mass-producing densified carbon nanotube fiber. The method includes preparing carbon nanotube fiber, swelling the carbon nanotube fiber by applying an acid solution thereto, and stretching the carbon nanotube fiber, coagulating the stretched carbon nanotube fiber so as to remove the acid solution present therein, and drying the coagulated carbon nanotube fiber.

9 Claims, 10 Drawing Sheets

(56) References Cited

FOREIGN PATENT DOCUMENTS

| KR | 10-2012429 | B1 | | 11/2019 | | |
|---|---|---|---|---|---|---|
| WO | 03004741 | A1 | | 1/2003 | | |
| WO | WO-2020071655 | A1 | * | 4/2020 | ............ | D01D 5/084 |
| WO | WO-2022154985 | A1 | * | 7/2022 | | |

OTHER PUBLICATIONS

Jaegeun Lee et al., "Direct spinning and densification method for high-performance carbon nanotube fibers," Nature Communications, vol. 10, No. 2962, pp. 1-10, Jul. 4, 2019.

* cited by examiner

METHOD FOR PRODUCING DENSIFIED CARBON NANOTUBE FIBER

CROSS-REFERENCE TO RELATED APPLICATION

This application claims under 35 U.S.C. § 119(a) the benefit of priority to Korean Patent Application No. 10-2020-0046900 filed on Apr. 17, 2020, the entire contents of which are incorporated herein by reference.

BACKGROUND

(a) Technical Field

The present disclosure relates to a method for mass-producing densified carbon nanotube fiber.

(b) Background Art

In general, carbon nanotubes (CNTs) are a type of carbon allotrope that has a structure, in which graphene is rolled into a cylindrical shape, and has a diameter of several nm. CNTs are being actively researched in the academic world due to the excellent mechanical and physical properties thereof, and have tensile strength of dozens of GPa, electrical conductivity of 10,000,000 S/cm, and thermal conductivity of 6,600 W/mK.

However, CNTs are short in actual length and thus have difficulty exhibiting the performance thereof when applied to a composite material, are difficult to handle directly, and have low dispersibility and thus the range of application thereof is limited. However, on entering the 2000s, technology for producing long fibers formed of CNTs has been developed, and thereby, the possibility of various applications for CNTs has been suggested.

Carbon nanotube (CNT) fiber means yarn into which carbon nanotubes are physically woven, or fiber into which carbon nanotubes are chemically connected.

Among methods for producing carbon nanotube fibers, there are broadly two methods which are suitable for mass-production. The first method is a direct spinning method. The direct spinning method was first announced at Cambridge University in 2004, and in this case, when carbon nanotubes are synthesized in vapor, the carbon nanotubes are directly drawn in the form of fiber, as if making cotton candy. A series of processes is performed continuously, fiber formation is carried out simultaneously with synthesis of the carbo nanotubes, and thus processing is simple. Further, a separate carbo nanotube dissolution process is not performed, and thus, carbon nanotube fiber formed of long carbon nanotubes can be produced. However, this method has limitations, such as a low density and a low degree of orientation.

The second method is a wet spinning method. In the wet spinning method, carbon nanotube fiber is spun from a dope prepared by dispersing carbon nanotubes in a solvent. In general, carbon nanotubes are not easily dispersed in most solvents. At Rice University, the fact that chlorosulfonic acid (CSA) can thermodynamically dissolve carbon nanotubes and the solution acquired thereby has a liquid crystal phase was observed. Utilizing liquid crystalline dope, research team at Rice university could produce fibers having a high degree of orientation and high density were produced. However, with this technique, it is difficult to dissolve carbon nanotubes having a long length, and thus, it is difficult to produce carbon nanotube fiber formed of long carbon nanotubes.

The inventors of the present invention suggested a novel method for manufacturing carbon nanotube fiber in which the advantages of the two methods are combined, in Korean Patent Registration No. 10-1972987. Concretely, the direct spinning method is used, and a solvent and a coagulation method used in the wet spinning method are used in a post-treatment process. That is, after carbon nanotube fiber is synthesized through the direct spinning method, carbon nanotube fiber having high strength and high electrical conductivity is manufactured by treating the synthesized carbon nanotube fiber with a strong acid solution used in the wet spinning method.

However, the above method yields very desirable results on a laboratory scale carbon nanotube fiber, which is too thin for direct use in most industrial applications. From industrial view, meanwhile, direct spinning synthesizes carbon nanotubes suffers from low throughput because only single strand of fiber can be produced from a reactor. The production throughput (g min$^{-1}$) of fiber per a direct-spinning reactor is evaluated as DL (g km-$^{1}$) multiplied by the spinning rate (km min–$^{1}$). The spinning rate cannot be easily increased beyond a certain level to yield continuous production of fiber, so leading manufacturers (e.g. Nanocomp Technologies, Inc.) increase the production throughput by producing CNTFs that have high linear density (4 tex~10 tex). However, carbon nanotube fibers from mass production are two orders of magnitude thicker than the common fibers from lab-scale study, and have much different structural characteristics and properties, so the treatment conditions must be optimized to establish a practical densification protocol.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art, and it is an object of the present invention to provide a method for mass-producing densified carbon nanotube fiber.

It is another object of the present invention to provide a method for producing densified carbon nanotube fiber having excellent physiochemical properties, such as specific strength and electrical conductivity, while having excellent mass-producibility and productivity.

In one aspect, the present invention provides a method for producing densified carbon nanotube fiber, the method including preparing carbon nanotube fiber, swelling the carbon nanotube fiber by applying an acid solution thereto, and stretching the carbon nanotube fiber, coagulating the stretched carbon nanotube fiber so as to remove the acid solution present therein, drying the coagulated carbon nanotube fiber.

In a preferred embodiment, in the preparing the carbon nanotube fiber, as-spun carbon nanotube fiber may be prepared by a direct spinning method.

In another preferred embodiment, in the preparing the carbon nanotube fiber, carbon nanotube fiber having a linear density equal to or greater than 5 tex may be prepared.

In still another preferred embodiment, in the swelling and stretching the carbon nanotube fiber, the carbon nanotube fiber may be immersed in the acid solution.

In yet another preferred embodiment, the acid solution may be one selected from the group consisting of chlorosulfuric acid ($HSO_3Cl$), fluorosulfuric acid ($HSO_3F$), trifluoroacetic acid ($CF_3COOH$), trifluoromethanesulfonic acid ($CF_3SO_3H$), fluoroantimonic acid ($H_2FSbF_6$), carborane acid, and combinations thereof.

In still yet another preferred embodiment, in the swelling and stretching the carbon nanotube fiber, the carbon nanotube fiber may be immersed in the acid solution for 1 minute or longer.

In a further preferred embodiment, in the swelling and stretching the carbon nanotube fiber, the carbon nanotube fiber is stretched to a stretching ratio greater than 0% but less than or equal to 200%.

In another further preferred embodiment, in the coagulating the stretched carbon nanotube fiber, the stretched carbon nanotube fiber may be coagulated by applying a coagulation solution, selected from the group consisting of diethyl ether, fuming sulfuric acid (oleum) and a combination thereof, to the stretched carbon nanotube fiber.

In still another further preferred embodiment, the coagulation solution mat include 50% by weight to 85% by weight of diethyl ether and 15% by weight to 50% by weight of oleum.

In yet another further preferred embodiment, in the drying the coagulated carbon nanotube fiber, the coagulated carbon nanotube fiber may be dried while applying tension thereto.

In another aspect, the present invention provides a densified carbon nanotube fiber configured to have a linear density equal to or greater than 3 tex, a density of 0.60 g/cm$^3$ to 1.5 g/cm$^3$, specific strength equal to or greater than 0.4 N/tex, tensile strength equal to or greater than 0.2 GPa, electrical conductivity equal to or greater than $0.3 \times 10^4$ S/cm, and a cross-sectional area equal to or greater than 1,000 μm$^2$.

In a preferred embodiment, a cross-section of the densified carbon nanotube fiber may have a curvature of a circle or a deformed circle.

In another preferred embodiment, on an assumption that a region of the densified carbon nanotube fiber corresponding to 50% of a depth thereof in a direction from a surface thereof to a center thereof based on a cross-section thereof is defined as a surface portion and a remaining region of the densified carbon nanotube fiber is defined as a central portion, a porosity difference between the surface portion and the central portion may be equal to or less than 10%.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 3A is a graph showing results of measurement of linear densities of the specimens, FIG. 3B is a graph showing results of measurement of cross-sectional areas of the specimens, FIG. 3C is a graph showing results of densities of the specimens, FIG. 3D is a graph showing results of measurement of specific strengths of the specimens, FIG. 3E is a graph showing results of measurement of tensile strengths of the specimens, and FIG. 3F is a graph showing results of measurement of electrical conductivities of the specimens;

FIG. 4A is an image showing the result of analysis of a pristine specimen, and FIGS. 4B to 4G are images showing the results of analysis of specimens having stretching ratios of 0%, 20%, 40%, 60%, 80% and 100%;

FIG. 5A is an image showing the result of analysis of a carbon nanotube fiber specimen using acetone as a coagulation solution, and FIG. 5B is an image showing the result of analysis of a carbon nanotube fiber specimen using diethyl ether and fuming sulfuric acid as a coagulation solution; FIG. 6A is a graph showing the result of measurement of the specific strength of a carbon nanotube fiber specimen dried without applying tension thereto, and FIG. 6B is a graph showing the result of measurement of the specific strength of a carbon nanotube fiber specimen dried while applying tension thereto.

Figure 1:
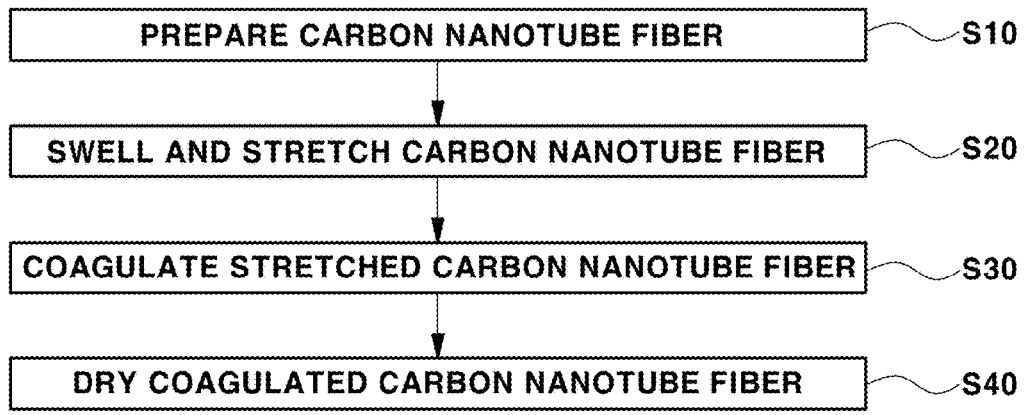
FIG. 1 is a flowchart schematically showing a method for producing densified carbon nanotube fiber according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments that fall within the spirit and scope of the invention as defined by the appended claims.

In the following description of the embodiments, the same elements are denoted by the same reference numerals even when they are depicted in different drawings. In the drawings, the dimensions of structures are exaggerated compared to the actual dimensions thereof, for clarity of description. In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the invention. Singular expressions may encompass plural expressions, unless they have clearly different contextual meanings.

In the following description of the embodiments, terms, such as "including" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are to be understood to be modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, "carbon nanotube fiber" means a nano-structure in which carbon nanotubes are physically woven in the form of a spun yarn or in which carbon nanotubes are chemically connected in the form of a fiber.

Further, "carbon nanotube fiber" conceptually includes single-wall carbon nanotube fiber, double-wall carbon nanotube fiber, and multi-wall carbon nanotube fiber.

In addition, "fiber" refers to the form of a thin and long fiber, and conceptually includes filaments or yarns.

FIG. 1 is a flowchart schematically showing a method for producing densified carbon nanotube fiber according to the present invention. Referring to this figure, the method includes preparing carbon nanotube fiber (S10), swelling the carbon nanotube fiber by applying an acid solution thereto and stretching the carbon nanotube fiber (S20), coagulating the stretched carbon nanotube fiber so as to remove the acid solution present therein (S30), and drying the coagulated carbon nanotube fiber (S40).

Figure 2:
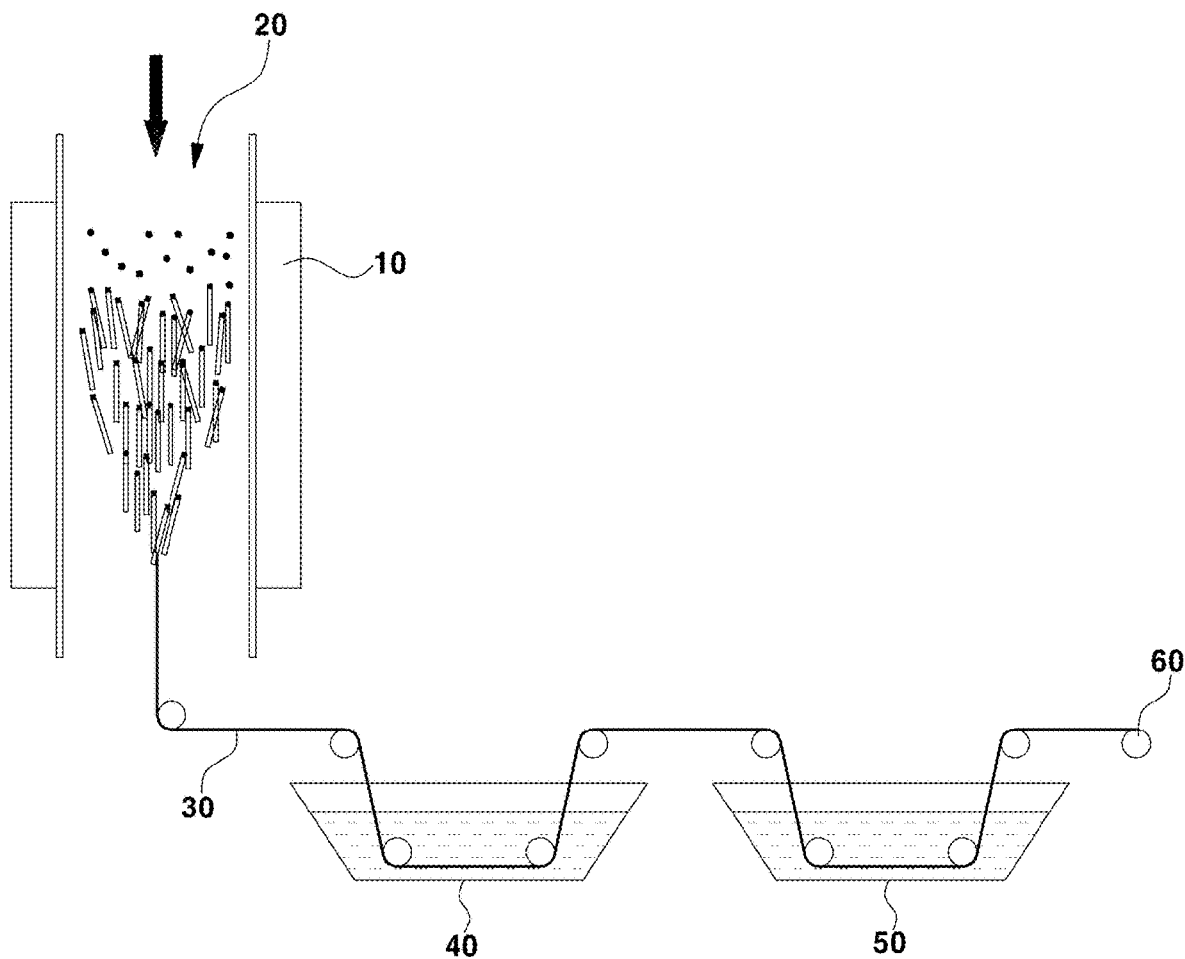
FIG. 2 is a conceptual view illustrating densification of carbon nanotube fiber according to one embodiment of the present invention.

FIG. 2 is a conceptual view illustrating densification of carbon nanotube fiber according to one example of implementation of the present invention. Referring to this figure, carbon nanotubes are prepared formed by putting a carbon source, a catalyst and an activator, serving as raw materials 20 of carbon nanotubes, into an inlet provided at the upper end of a fluidized bed reactor 10 and then moving the raw materials 20 downwards in the fluidized bed reactor 10, and are combined to form carbon nanotube fiber 30. The carbon nanotube fiber 30 continuously passes through a swelling tub 40 containing an acid solution by rollers. Here, the carbon nanotube fiber 30 is stretched by applying tension thereto using the rolling force of the rollers. Thereafter, the stretched carbon nanotube fiber passes through a coagulation tank 50 containing a coagulation solution, and thereby, densified carbon nanotube fiber 60 is acquired.

Here, referring to FIGS. 1 and 2, the method for producing the densified carbon nanotube fiber 60 according to the present invention will be described in more detail.

First, the carbon nanotube fiber 30 is prepared (S10). The carbon nanotube fiber 30 may be as-spun by the direct spinning method. This may be performed using the above-described fluidized bed reactor 10. For example, carbon nanotube aerogel may be formed by injecting a solution formed of a suitable combination of acetone, ferrocene, thiophene, etc. into the fluidized bed reactor 10, heated to a temperature of 1,000° C. or higher, at a designated speed, and be drawn into the form of fiber from the fluidized bed reactor 10 at a designated speed.

Particularly, the present invention is characterized in that carbon nanotube fiber 30 having a linear density equal to or greater than 5 tex is used. The upper limit value of the linear density is not limited to a specific value. For example, the linear density of the carbon nanotube fiber 30 may be equal to or less than 10 tex, equal to or less than 50 tex, or equal to or less than 100 tex. As such, when the carbon nanotube fiber 30 having the linear density equal to or greater than 5 tex is used, mass-producibility and productivity may be greatly improved. For reference, carbon nanotube fiber having a linear density of about 0.05 tex is generally used in laboratory processes, whereas, in contrast, carbon nanotube fiber 30 having a linear density about 100 times higher than the linear density of the carbon nanotube fiber generally used in laboratory processes is used in the present invention.

The IG/ID ratio of the carbon nanotube fiber 30 is not limited to a specific value and, for example, may be equal to or greater than 5, equal to or greater than 7, equal to or greater than 10, or equal to or greater than 15. Here, IG indicates the maximum peak intensity in the range of 1,560 $cm^{-1}$ to 1,600 $cm^{-1}$ in resonance Raman spectroscopy, and ID indicates the peak intensity in the range of 1,310 $cm^{-1}$ to 1,350 $cm^{-1}$ in resonance Raman spectroscopy. When the IG/ID ratio is equal to or greater than 5, swelling and stretching effects, which will be described below, increase. The upper limit value of the IG/ID ratio may be 500, 1,000 or 10,000, without being limited thereto.

When the carbon nanotubes take the form of fiber, the movement thereof is greatly limited. Therefore, it is difficult to remove voids which are nonuniformly disposed within the carbon nanotube fiber 30. These voids cause degradation of physiochemical properties, such as specific strength, electrical conductivity, etc., of the carbon nanotube fiber 30. Therefore, in the present invention, these voids are removed by densifying the carbon nanotube fiber 30, and the process thereof will be described in detail below.

First, the carbon nanotube fiber 30 is swollen by applying the acid solution thereto, and is stretched (S20). When the carbon nanotube fiber 30 is immersed in the swelling tub 40 containing the acid solution, the carbon nanotube fiber 30 is swollen by the acid solution. At this time, when tensile force is applied to the carbon nanotube fiber 30 by a winding apparatus or the like, the carbon nanotube fiber 30 is stretched. Consequently, the carbon nanotubes included in the carbon nanotube fiber 30 are oriented and rearranged in the axial direction of the carbon nanotube fiber 30.

The acid solution may be one selected from the group consisting of chlorosulfuric acid ($HSO_3Cl$), fluorosulfuric acid ($HSO_3F$), trifluoroacetic acid ($CF_3COOH$), trifluoromethanesulfonic acid ($CF_3SO_3H$), fluoroantimonic acid ($H_2FSbF_6$), carborane acid, and combinations thereof.

The carbon nanotube fiber 30 may be immersed in the acid solution for 1 minute or longer. When the immersion time is less than 1 minute, the carbon nanotube fiber 30 may not be sufficiently swollen. The upper limit value of the immersion time is not limited to a specific value, and, for example, may be 2 minutes or 5 minutes. When the immersion time is excessively long, productivity may be lowered and there is the possibility of damage to the carbon nanotube fiber 30 due to the acid solution.

The stretching ratio of the carbon nanotube fiber 30 may be greater than 0% but less than or equal to 200%, be greater than 0% but less than or equal to 100%, or be 40% to 100%. When the stretching ratio is within the above range, productivity and mass-producibility are the most excellent. When the stretching ratio is excessively great, there is the possibility of damage to the carbon nanotube fiber 30.

Thereafter, the acid solution is removed by coagulating the stretched carbon nanotube fiber (S30). The stretched carbon nanotube fiber may pass through the coagulation tank 50 containing the coagulation solution, thereby being coagulated. During the process of coagulating the stretched carbon nanotube fiber, the acid solution present therein is discharged.

Here, appropriate adjustment of the coagulation speed of the stretched carbon nanotube fiber is very important and, when the coagulation speed is excessively high, the acid solution may not be removed from the central portion of the carbon nanotube fiber. In this state, when the carbon nanotube fiber passes through a drying operation which will be described below, pores may be formed in the central portion of the carbon nanotube fiber, and thereby, the physiochemical properties, such as specific strength, electrical conductivity, etc., of the carbon nanotube fiber may be degraded.

If the carbon nanotube fiber 30 having a high linear density according to the present invention is used, the possibility of the above-described degradation of the physiochemical properties increases further. Therefore, the present invention is characterized in that the carbon nanotube fiber 30 is coagulated using a coagulation solution including a specific combination, so as to remove the acid solution from the central portion and the surface portion of the carbon nanotube fiber 30 with maximum uniformity.

Concretely, the coagulation solution may be one selected from the group consisting of diethyl ether, fuming sulfuric acid (oleum) and a combination thereof. Preferably, the coagulation solution may include 50% by weight to 85% by weight of diethyl ether and 15% by weight to 50% by weight of oleum.

The densified carbon nanotube fiber may be acquired by drying the coagulated carbon nanotube fiber (S40). During the process of drying the coagulated carbon nanotube fiber, the acid solution present at a small amount in the carbon nanotube fiber is evaporated, and micropores are formed in the carbon nanotube fiber.

Here, in the present invention, in order to reduce the size of the micropores, the carbon nanotube fiber is dried while applying tension thereto. Because the pores in the carbon nanotube fiber degrade the physiochemical properties, such as specific strength, electrical conductivity, etc., of the carbon nanotube fiber, as described above, degradation of the physiochemical properties of the carbon nanotube fiber may be prevented by reducing the size of the micropores.

The magnitude of tension applied during the process of drying the carbon nanotube fiber is not limited to a specific value and, for example, the magnitude of tension may be applied so as to avoid stretching of the carbon nanotube fiber or so as to allow the carbon nanotube fiber to be stretched to a stretching ratio of 5% or lower.

The drying conditions of the carbon nanotube fiber are not limited to specific conditions and, for example, the carbon nanotube fiber may be dried at a temperature of 150° C. to 200° C.

The densified carbon nanotube fiber produced by the above-described method may have a linear density equal to or greater than 3 tex. As described above, in the present invention, carbon nanotube fiber 30 having a linear density equal to or greater than 5 tex is used, and thus, the linear density of the densified carbon nanotube fiber acquired as a product is very high. For reference, the upper limit value of the linear density of the densified carbon nanotube fiber is limited to a specific value and, for example, may be 30 tex, 15 tex, or 10 tex.

The cross-sectional area of the densified carbon nanotube fiber may be equal to or greater than 1,000 $\mu m^2$ or 2,000 $\mu m^2$. However, the cross-sectional area may be changed depending on the kind of the carbon nanotube tube fiber, the stretching ratio thereof, etc., and thus is not limited to the above numerical range.

The density of the densified carbon nanotube fiber may be 0.60 $g/cm^3$ to 1.5 $g/cm^3$ or be 0.60 $g/cm^3$ to 1.2 $g/cm^3$.

As such, the densified carbon nanotube fiber is highly and uniformly densified, and thus has excellent physiochemical properties, i.e., specific strength equal to or greater than 0.4 N/tex, tensile strength equal to or greater than 0.2 GPa and electrical conductivity equal to or greater than $0.3 \times 10^4$ S/cm.

TEST EXAMPLE 1

Carbon nanotube fiber having a linear density of about 6 tex was prepared using an aerogel direct spinning method. The carbon nanotube fiber was immersed in chlorosulfuric acid as an acid solution to swell the same, and then tension was gradually applied to the carbon nanotube fiber, thereby producing carbon nanotube fibers stretched to have stretching ratios of 0% (i.e., in a specimen to which no tension is applied), 20%, 40%, 60%, 80% and 100%. It took a total of 3 minutes to execute these swelling and stretching processes. The respective stretched carbon nanotube fibers were coagulated by applying a coagulation solution including 85% by weight of diethyl ether and 15% by weight of oleum thereto. Densified carbon nanotube fiber specimens were acquired by drying the coagulated carbon nanotube fibers.

The linear densities, cross-sectional areas, densities, specific strengths, tensile strengths and electrical conductivities of the respective densified carbon nanotube fiber specimens were measured. The results of measurement are shown in FIGS. 3A to 3F. For reference, a pristine specimen is carbon nanotube fiber that has not been subjected to swelling, stretching or coagulating processes.

Figure 3A:
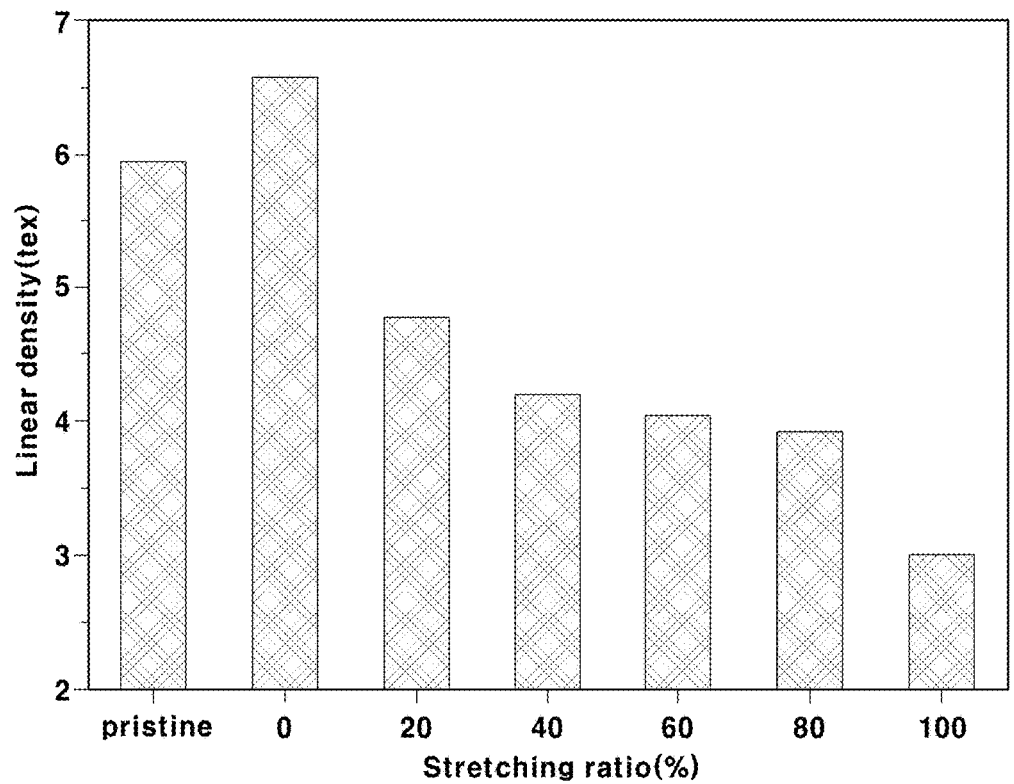
FIGS. 3A to 3F are graphs showing results of tests performed on respective specimens in Test Example 1 of the present invention, and more particularly.

Referring to FIG. 3A, it may be confirmed that the densified carbon nanotube fiber according to the present invention has a linear density of at least about 3 tex.

Figure 3B:
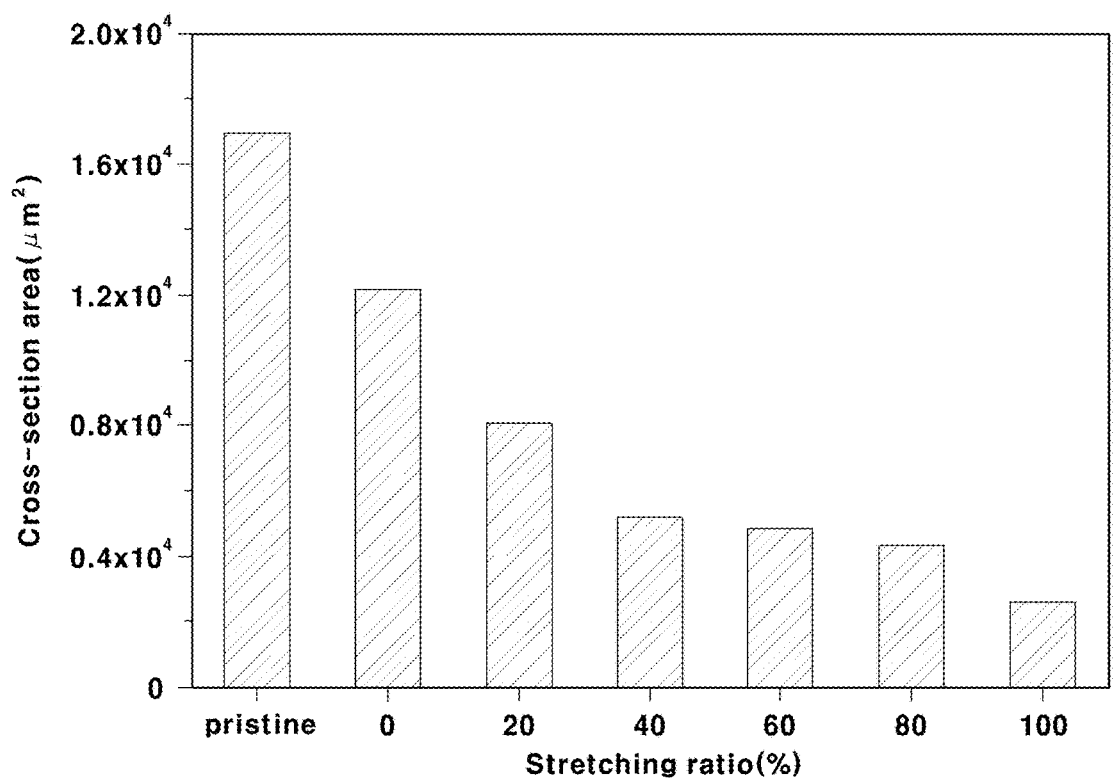

Referring to FIG. 3B, it may be confirmed that the cross-sectional area of the densified carbon nanotube fiber according to the present invention is decreased as the stretching ratio thereof was increased, and thus, the cross-sectional area of the specimen having the stretching ratio of 100% is about 2,605 $\mu m^2$.

Figure 3C:
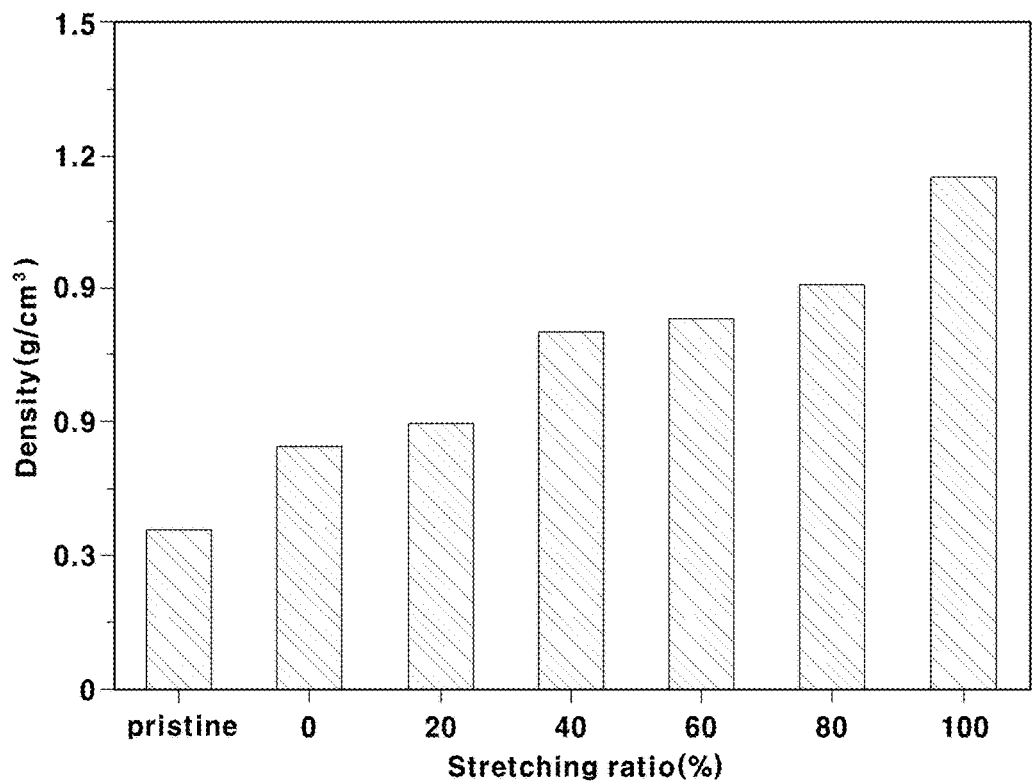

Referring to FIG. 3C, it may be confirmed that the density of the densified carbon nanotube fiber according to the present invention is increased as the stretching ratio thereof is increased, and thus, the density of the specimen having the stretching ratio of 100% is about 1.15 g/cm$^3$.

Figure 3D:
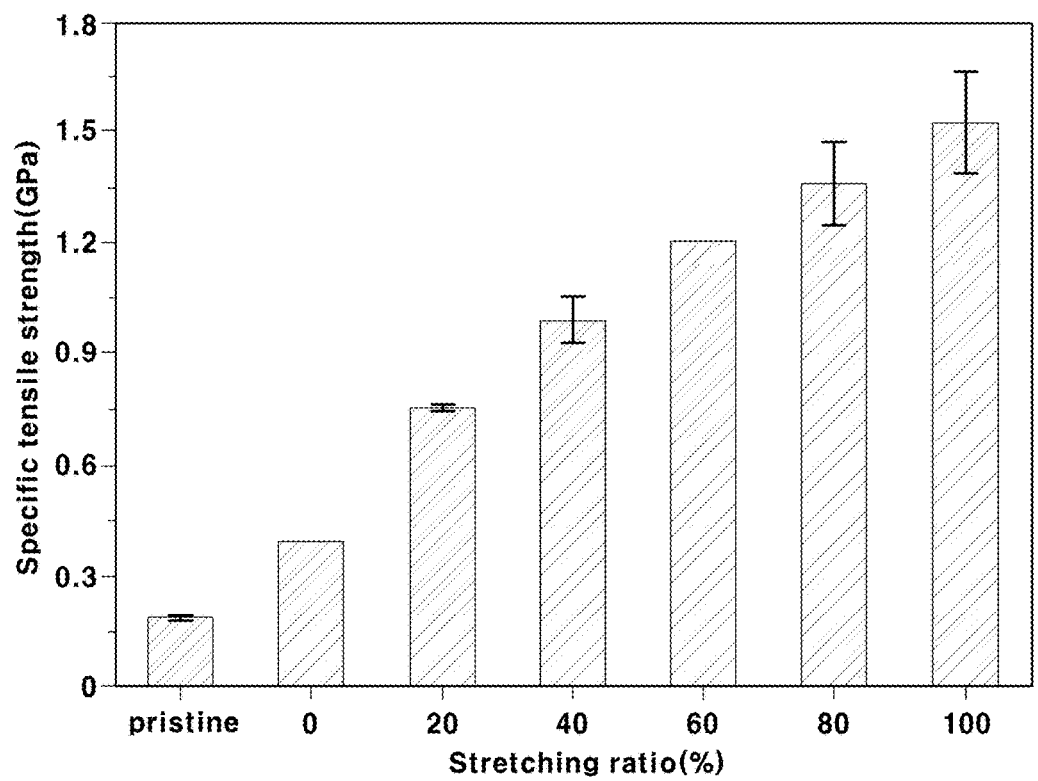

Referring to FIG. 3D, it may be confirmed that the specific strength of the densified carbon nanotube fiber according to the present invention is equal to or greater than 0.4 N/tex, and particularly, that the specific strength of the specimen having the stretching ratio of 100% is increased about 8 times or more compared to that of the pristine specimen.

Figure 3E:
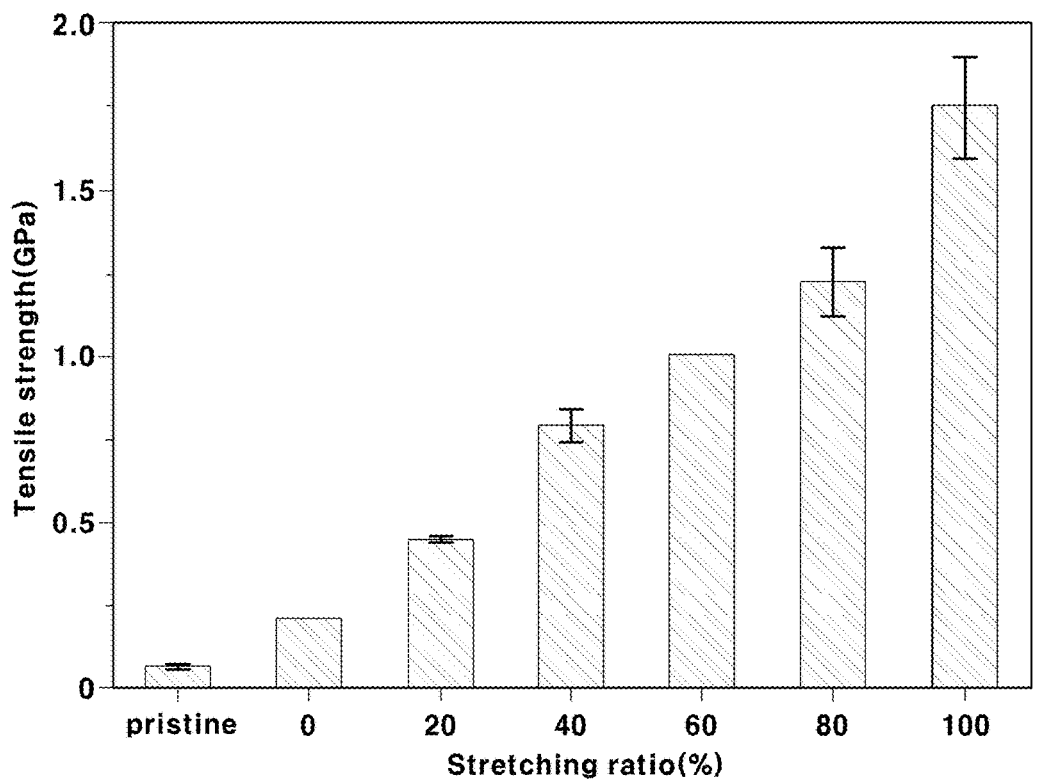

Referring to FIG. 3E, it may be confirmed that the tensile strength of the densified carbon nanotube fiber according to the present invention is equal to or greater than 0.2 GPa, and particularly, that the tensile strength of the specimen having the stretching ratio of 100% is improved about 30 times or more compared to that of the pristine specimen.

Figure 3F:
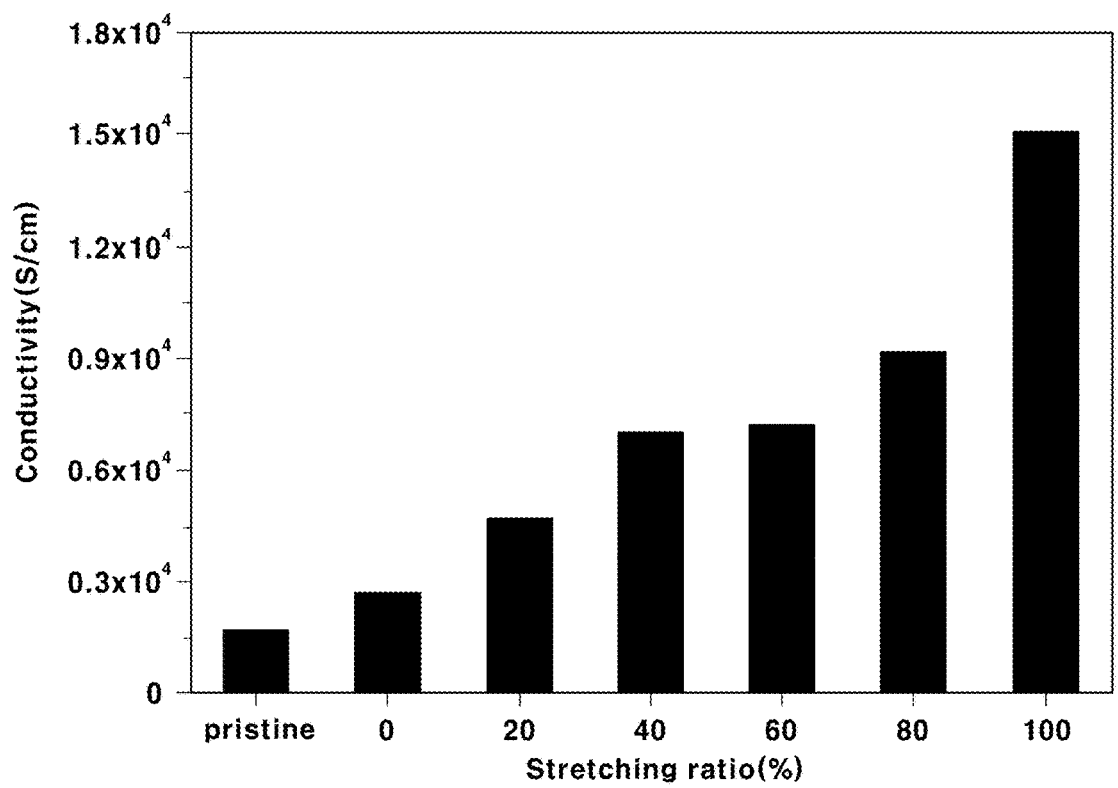
Figure 4A:
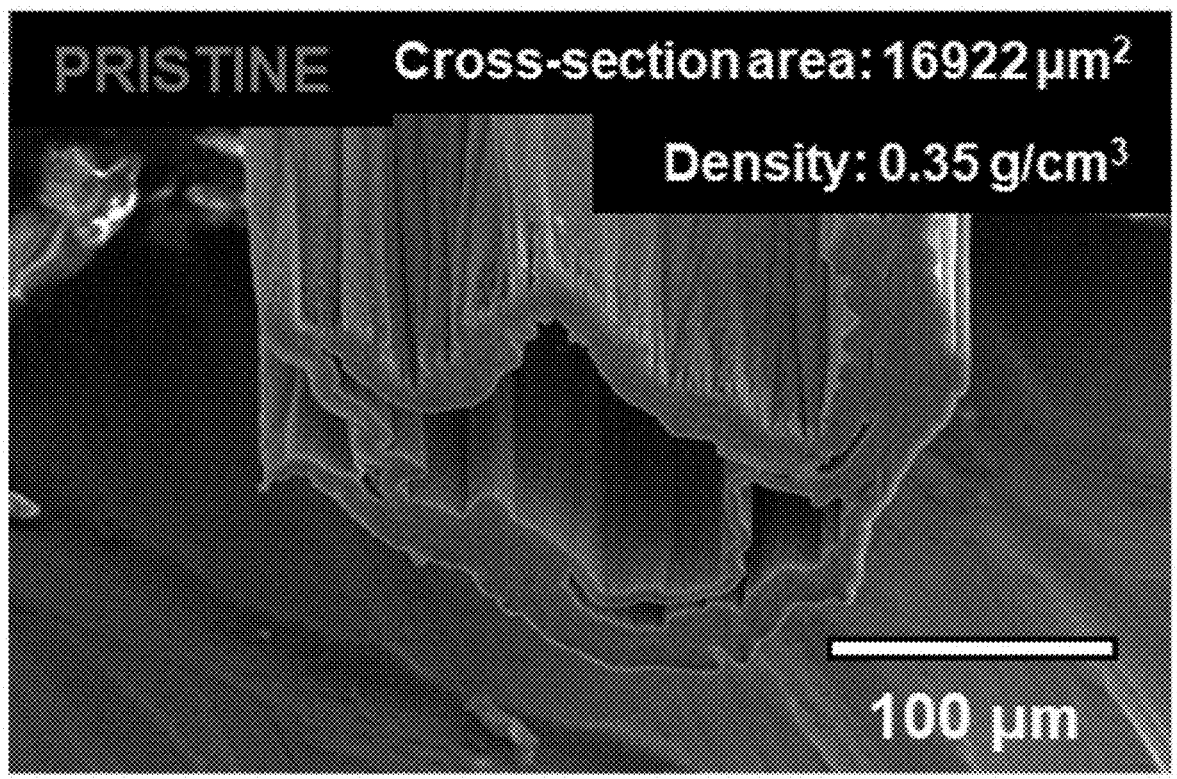
FIGS. 4A to 4G are images showing results of scanning electron microscope analysis of the respective specimens in Test Example 1 of the present invention, and more particularly.
Figure 4B:
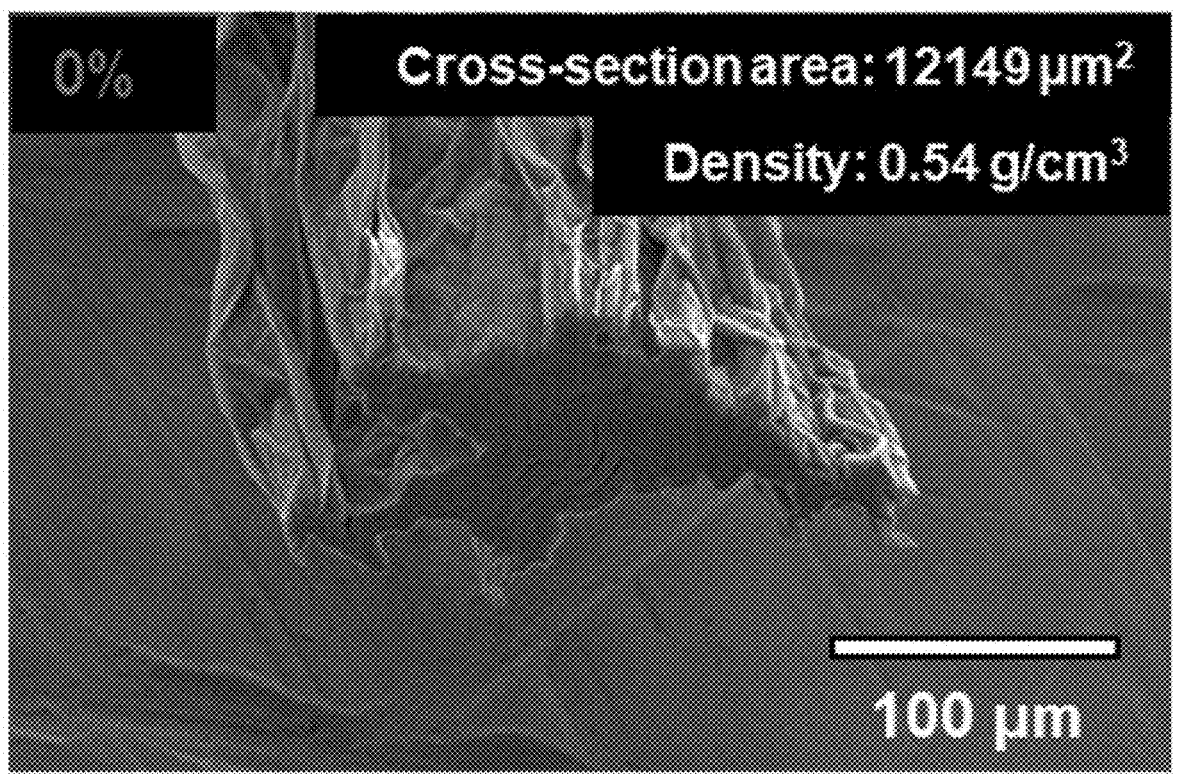
Figure 4C:
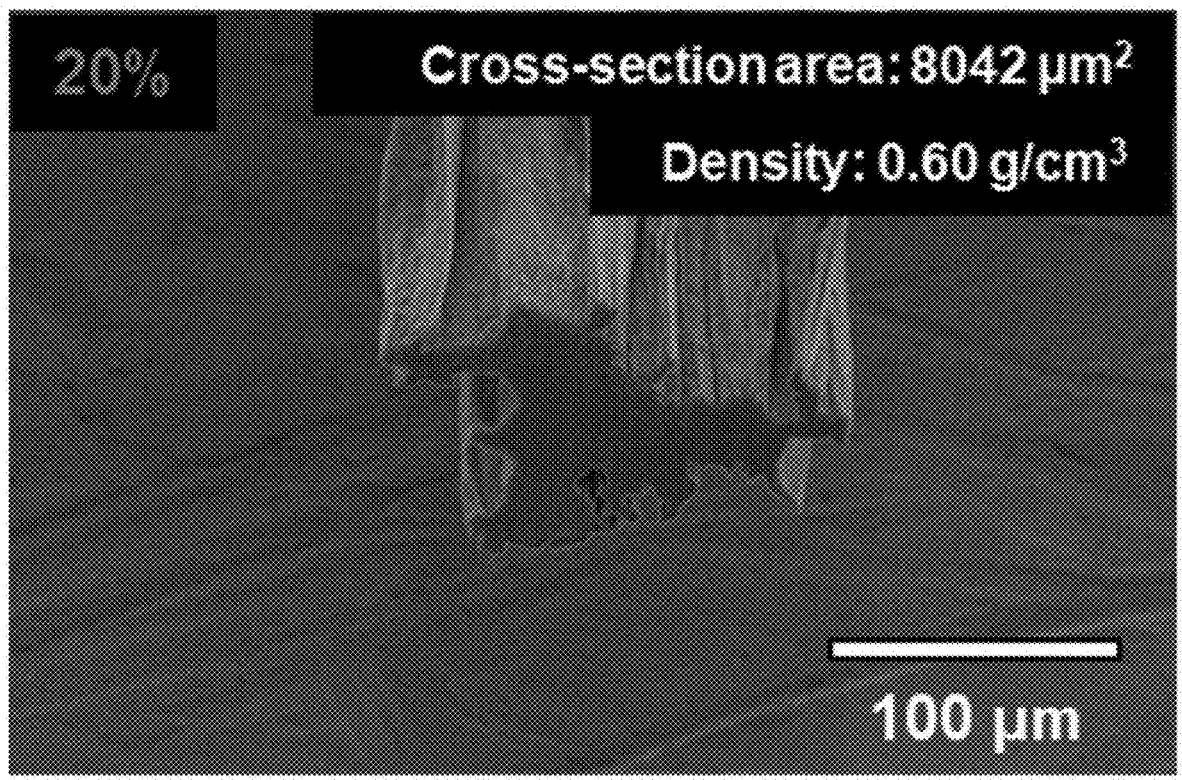
Figure 4D:
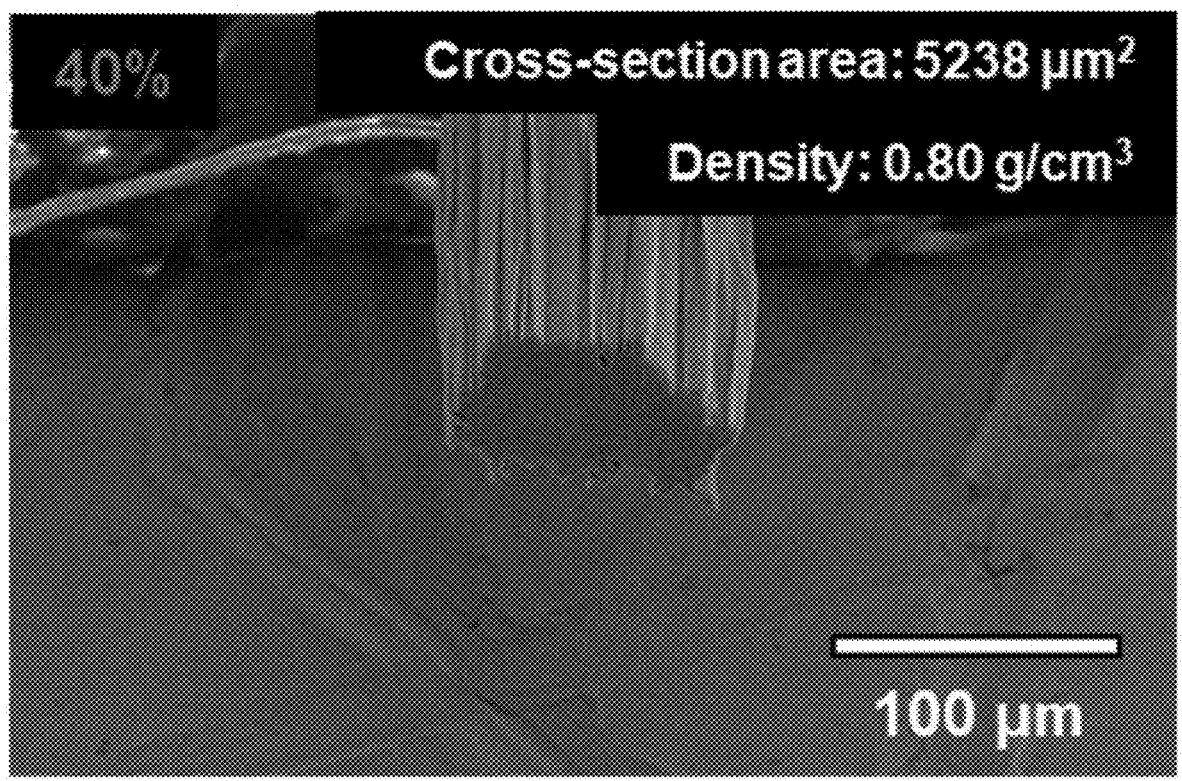
Figure 4E:
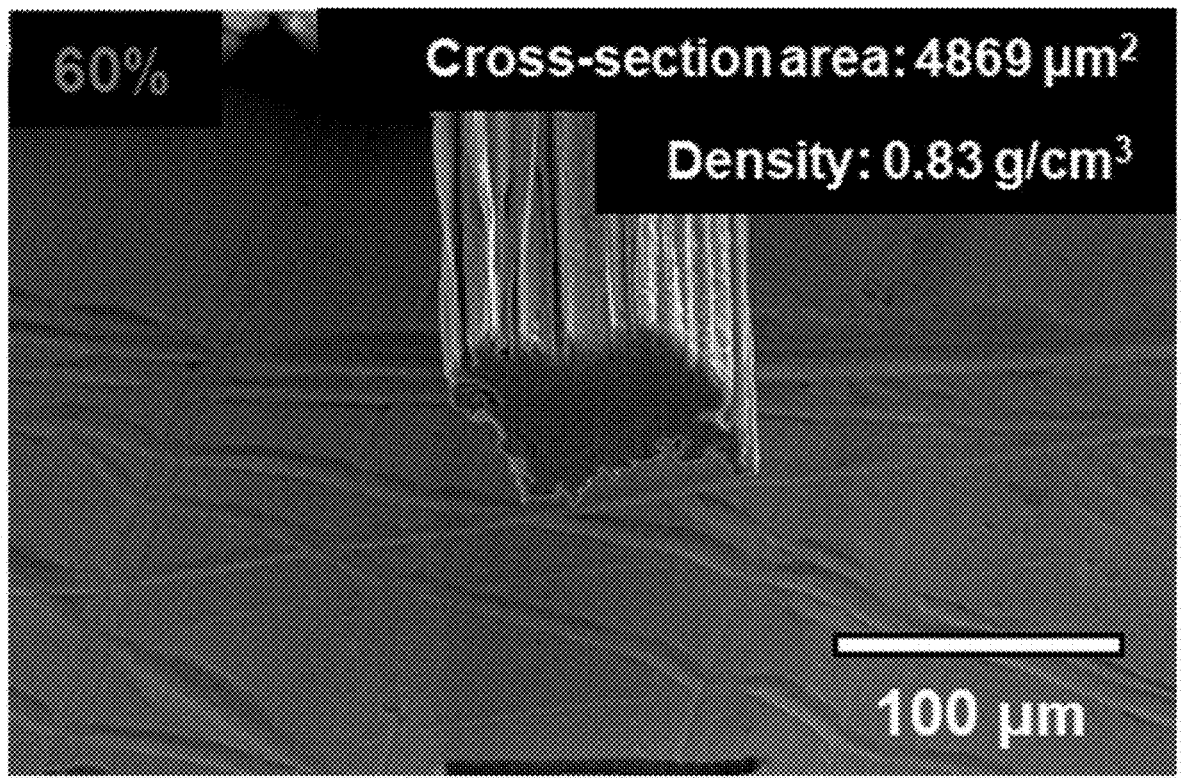
Figure 4F:
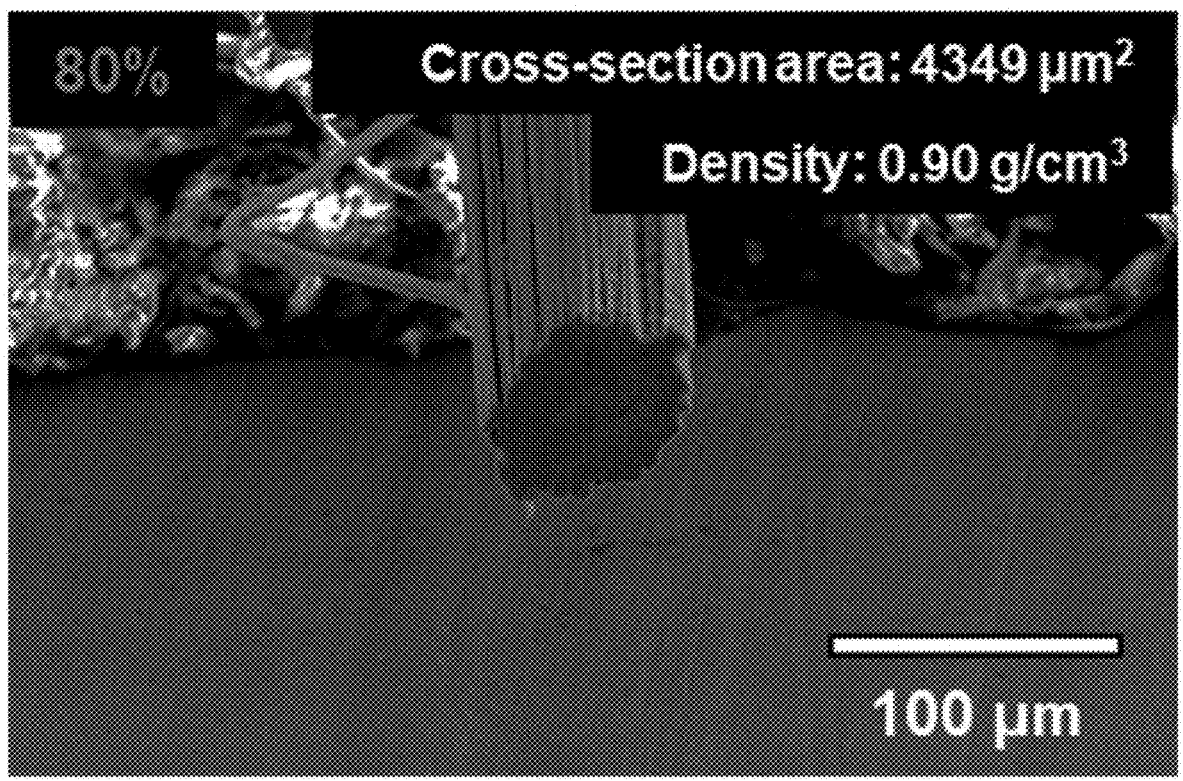
Figure 4G:
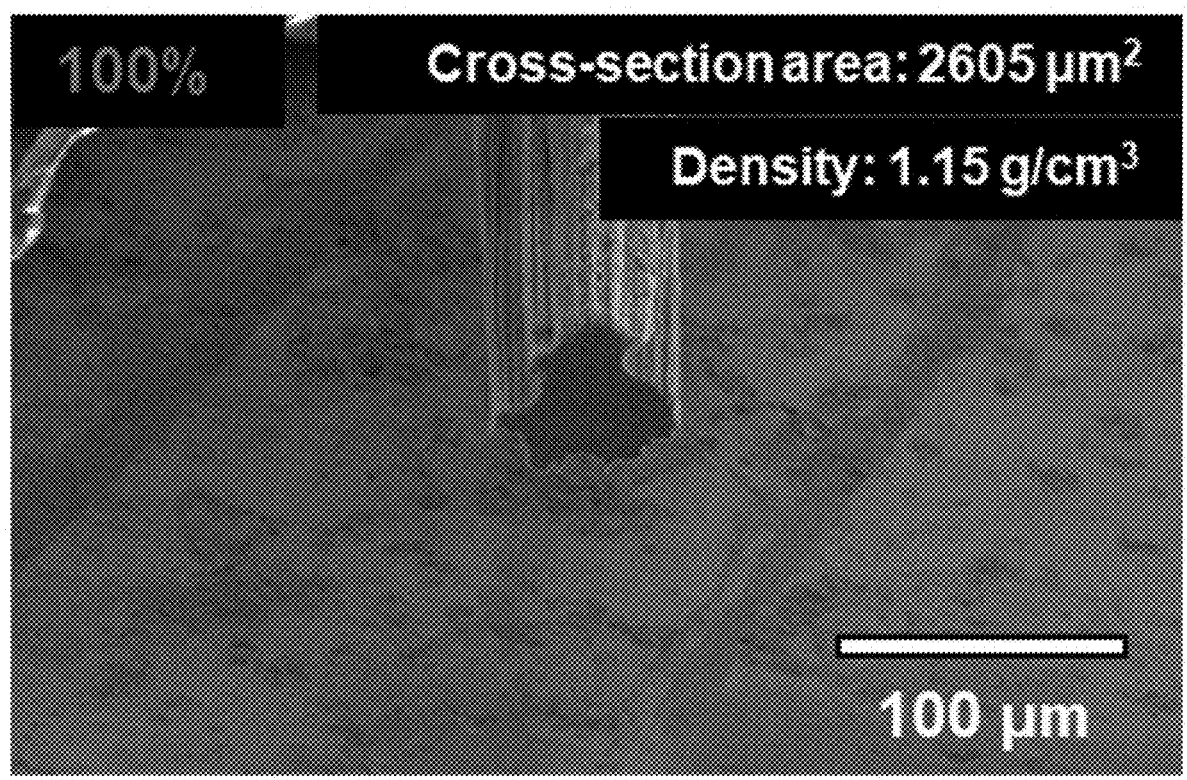

Referring to FIG. 3F, it may be confirmed that the electrical conductivity of the densified carbon nanotube fiber according to the present invention is equal to or greater than $0.3 \times 10^4$ S/cm, and particularly, that the electrical conductivity of the specimen having the stretching ratio of 100% is improved about 10 times or more compared to that of the pristine specimen.

Scanning electron microscope analysis of the cross-sections of the densified carbon nanotube fiber specimens was performed. The results of analysis are shown in FIGS. 4A to 4G. For reference, the pristine specimen was carbon nanotube fiber that had not been subjected to swelling, stretching or coagulating processes.

Referring to FIGS. 4A to 4G, it may be confirmed that the cross-section of the pristine specimen is very nonuniform due to the presence of large pores therein, whereas, in contrast, the cross section of the densified carbon nanotube fiber according to the present invention gradually takes on a shape having the curvature of a circle or a deformed circle as the stretching ratio thereof is increased.

TEST EXAMPLE 2

Carbon nanotube fiber having a linear density of about 6 tex was prepared using the aerogel direct spinning method. The carbon nanotube fiber was immersed in chlorosulfuric acid as an acid solution to swell the same, and then tension was gradually applied to the carbon nanotube fiber, thereby producing carbon nanotube fiber stretched to have a stretching ratio of 100%. It took a total of 3 minutes to execute these swelling and stretching processes.

The stretched carbon nanotube fiber was coagulated by respectively applying acetone and a mixture including 85% by weight of diethyl ether and 15% by weight of oleum as a coagulation solution thereto, thereby producing coagulated carbon nanotube fibers. Thereafter, densified carbon nanotube fiber specimens were acquired by drying the coagulated carbon nanotube fibers.

Figure 5A:
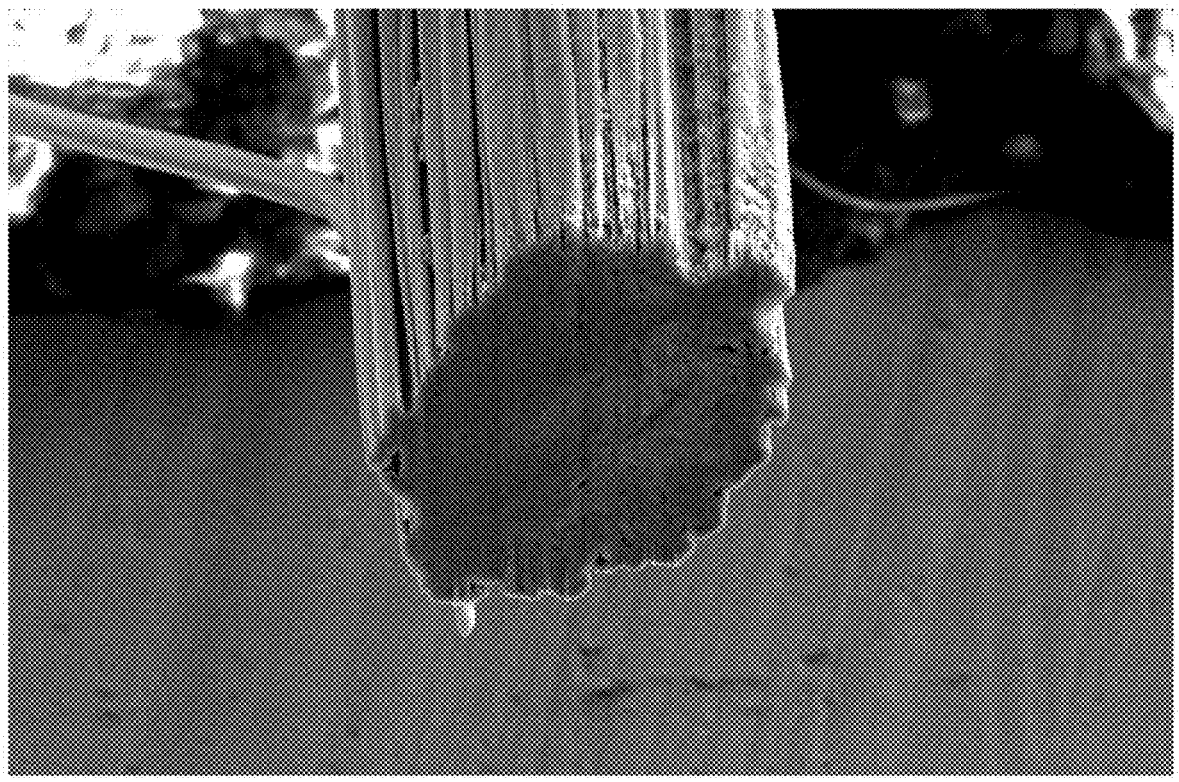
FIGS. 5A and 5B are images showing results of scanning electron microscope analysis of respective specimens in Test Example 2 of the present invention, and more particularly.
Figure 5B:
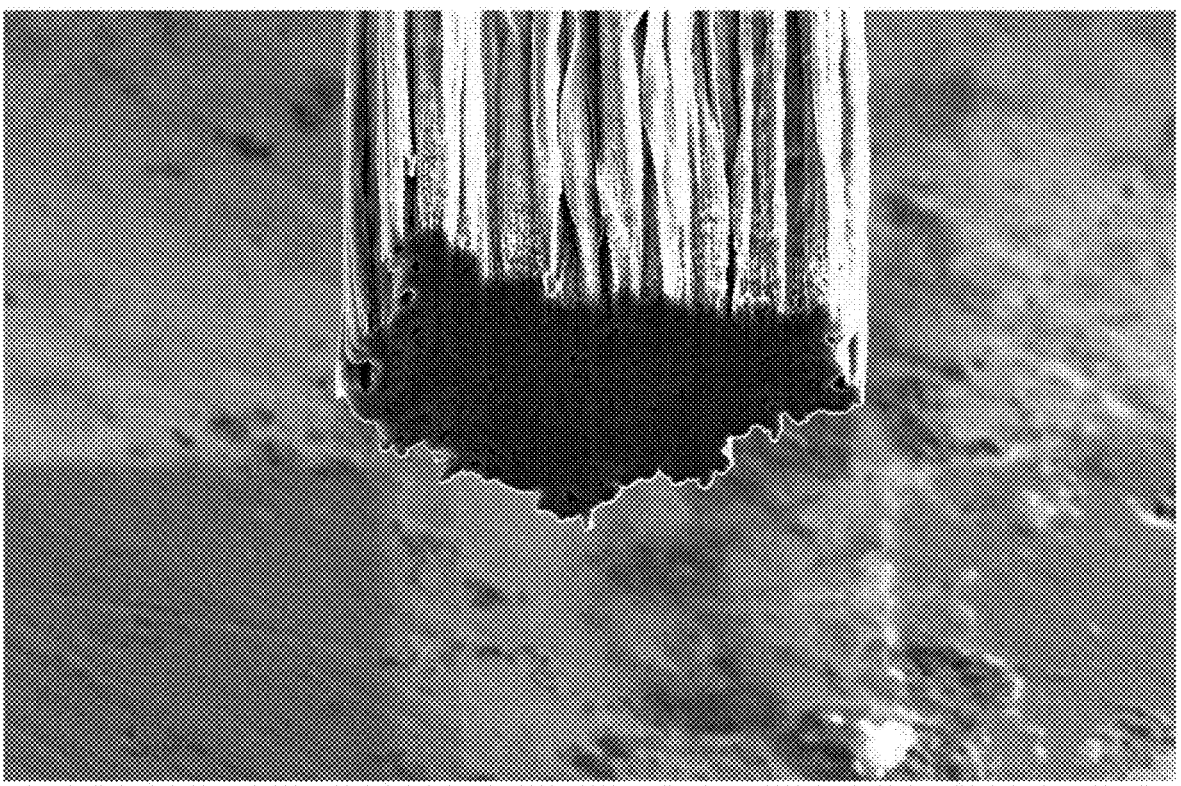

Scanning electron microscope analysis of the densified carbon nanotube fiber specimens was performed. The results of analysis are shown in FIGS. 5A and 5B. Concretely, FIG. 5A is an image showing the result of analysis of the carbon nanotube fiber specimen using acetone as the coagulation solution, and FIG. 5B is an image showing the result of analysis of the carbon nanotube fiber specimen using diethyl ether and oleum as the coagulation solution.

Referring to FIG. 5A, it may be confirmed that, when acetone was used as the coagulation solution, the coagulation speed of the carbon nanotube fiber was high and thus a lot of pores were formed. This means that the acid solution was not satisfactorily removed from the carbon nanotube fiber.

Referring to FIG. 5B, it may be confirmed that, when diethyl ether and oleum were used as the coagulation solution, the number of pores was greatly reduced, the acid solution was uniformly removed from the surface portion and the central portion of the carbon nanotube fiber, and thus, the pores were uniformly distributed.

TEST EXAMPLE 3

Carbon nanotube fiber having a linear density of about 6 tex was prepared using the aerogel direct spinning method. The carbon nanotube fiber was immersed in chlorosulfuric acid as an acid solution to swell the same, and then tension was gradually applied to the carbon nanotube fiber, thereby producing carbon nanotube fiber stretched to have a stretching ratio of 100%. It took a total of 3 minutes to execute these swelling and stretching processes. The stretched carbon nanotube fiber was coagulated by applying a coagulation solution including 85% by weight of diethyl ether and 15% by weight of oleum, thereby producing coagulated carbon nanotube fiber. Thereafter, densified carbon nanotube fiber specimens were acquired by drying the coagulated carbon nanotube fiber without applying tension thereto and while applying tension thereto.

Figure 6A:
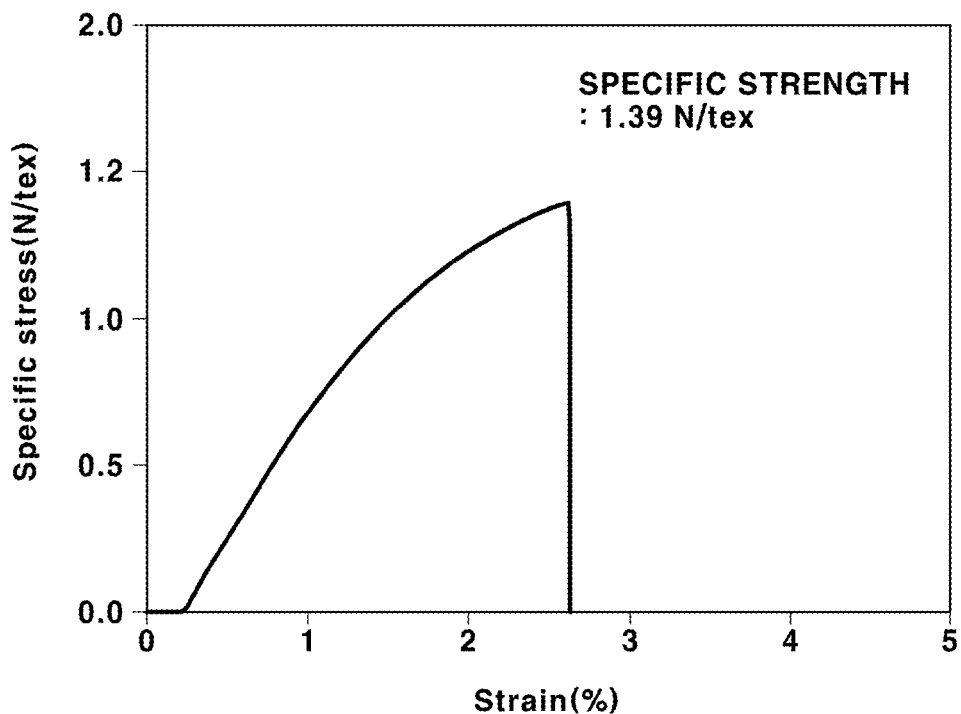
FIGS. 6A and 6B are graphs showing results of measurement of specific strengths of respective specimens in Test Example 3 of the present invention, and more particularly.
Figure 6B:
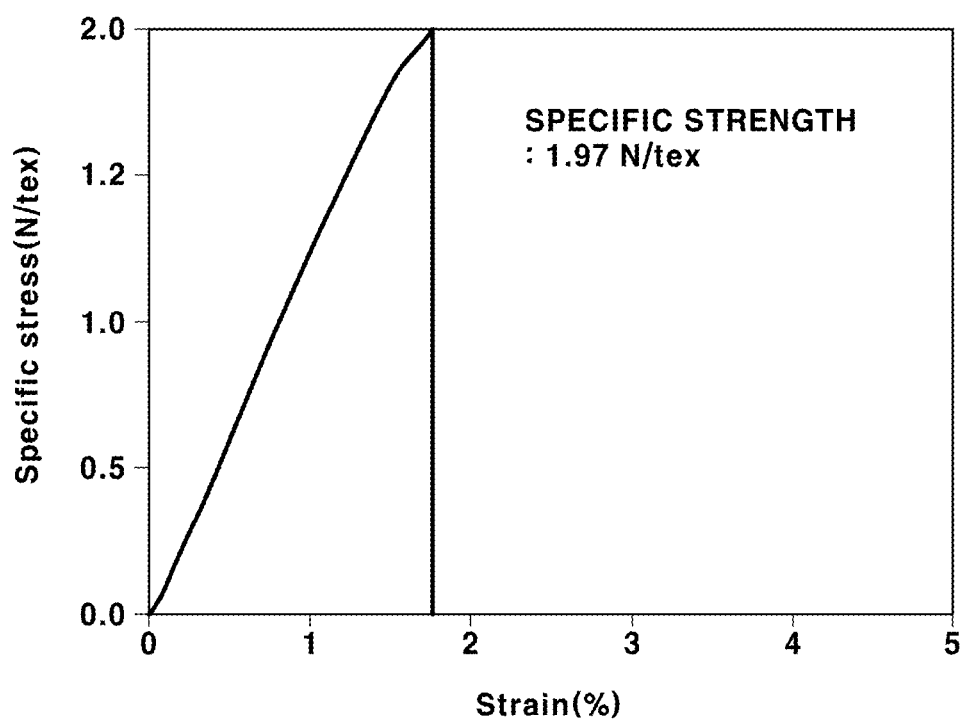

The specific strengths of the densified carbon nanotube fiber specimens acquired by the above-describe method were measured. The results of measurement are shown in FIGS. 6A and 6B. Concretely, FIG. 6A is a graph showing the result of measurement of the specific strength of the carbon nanotube fiber specimen acquired through drying without applying tension thereto, and FIG. 6B is a graph showing the result of measurement of the specific strength of the carbon nanotube fiber specimen acquired through drying while applying tension thereto.

Referring to FIGS. 6A and 6B, the specific strength of the carbon nanotube fiber specimen acquired through drying without applying tension thereto is 1.39 N/tex, and the specific strength of the carbon nanotube fiber specimen acquired through drying while applying tension thereto is 1.97 N/tex. That is, it may be confirmed that, when tension is applied to the carbon nanotube fiber during the process of drying the carbon nanotube fiber, the specific strength of the densified carbon nanotube fiber is further improved.

As is apparent from the above description, the present invention provides a method for mass-producing densified carbon nanotube fiber, thereby realizing commercialization of the carbon nanotube fiber.

Further, through the method according to the present invention, densified carbon nanotube fiber exhibiting both high strength typical of carbon fiber and high electrical conductivity close to that of metal may be produced.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for producing densified carbon nanotube fiber, the method comprising:
    preparing carbon nanotube fiber;
    swelling the carbon nanotube fiber by applying an acid solution thereto, and stretching the carbon nanotube fiber;
    coagulating the stretched carbon nanotube fiber so as to remove the acid solution present therein; and
    drying the coagulated carbon nanotube fiber;

wherein in the preparing the carbon nanotube fiber, carbon nanotube fiber having a linear density equal to or greater than 5 tex is prepared, and in the swelling and stretching the carbon nanotube fiber, the carbon nanotube fiber is stretched to a stretching ratio greater than 80% but less than or equal to 200%.

2. The method of claim 1, wherein, in the preparing the carbon nanotube fiber, as-spun carbon nanotube fiber is prepared by a direct spinning method.

3. The method of claim 1, wherein, in the swelling and stretching the carbon nanotube fiber, the carbon nanotube fiber is immersed in the acid solution.

4. The method of claim 1, wherein the acid solution is one selected from the group consisting of chlorosulfuric acid ($HSO_3Cl$), fluorosulfuric acid ($HSO_3F$), trifluoroacetic acid ($CF_3COOH$), trifluoromethanesulfonic acid ($CF_3SO_3H$), fluoroantimonic acid ($H_2FSbF_6$), carborane acid, and combinations thereof.

5. The method of claim 1, wherein, in the swelling and stretching the carbon nanotube fiber, the carbon nanotube fiber is immersed in the acid solution for 1 minute or longer.

6. The method of claim 1, wherein, in the swelling and stretching the carbon nanotube fiber, the carbon nanotube fiber is stretched to a stretching ratio greater than 100% but less than or equal to 200%.

7. The method of claim 1, wherein, in the coagulating the stretched carbon nanotube fiber, the stretched carbon nanotube fiber is coagulated by applying a coagulation solution, selected from the group consisting of diethyl ether, fuming sulfuric acid (oleum) and a combination thereof, to the stretched carbon nanotube fiber.

8. The method of claim 7, wherein the coagulation solution comprises 50% by weight to 85% by weight of diethyl ether and 15% by weight to 50% by weight of oleum.

9. The method of claim 1, wherein, in the drying the coagulated carbon nanotube fiber, the coagulated carbon nanotube fiber is dried while applying tension thereto.

* * * * *